US010024646B2

(12) United States Patent
Hale et al.

(10) Patent No.: US 10,024,646 B2
(45) Date of Patent: Jul. 17, 2018

(54) METHOD AND APPARATUS FOR DETERMINING A HOLE DEPTH

(71) Applicant: AIRBUS OPERATIONS LIMITED, Bristol (GB)

(72) Inventors: Greg Andrew Hale, Bristol (GB); Gareth William Landeg, Bristol (GB); Matthew Lee Godfrey, Bristol (GB); Richard James Clayton, Bristol (GB); David John Hall, Flintshire (GB)

(73) Assignee: AIRBUS OPERATIONS LIMITED, Bristol (GB)

( * ) Notice: Subject to any disclaimer, the term of this patent is extended or adjusted under 35 U.S.C. 154(b) by 160 days.

(21) Appl. No.: 14/974,093

(22) Filed: Dec. 18, 2015

(65) Prior Publication Data
US 2016/0178343 A1   Jun. 23, 2016

(30) Foreign Application Priority Data

Dec. 19, 2014  (GB) .................................. 1422820.9

(51) Int. Cl.
| | |
|---|---|
| *G01B 7/26* | (2006.01) |
| *B23B 49/00* | (2006.01) |
| *B23Q 17/20* | (2006.01) |
| *B23B 35/00* | (2006.01) |

(52) U.S. Cl.
CPC ................ *G01B 7/26* (2013.01); *B23B 35/00* (2013.01); *B23B 49/00* (2013.01); *B23Q 17/20* (2013.01); *B23B 2215/04* (2013.01); *B23B 2260/128* (2013.01); *B23B 2270/32* (2013.01); *B23B 2270/483* (2013.01)

(58) Field of Classification Search
CPC ........................... B23Q 17/0966; B23Q 17/22
USPC ....................... 33/638; 408/8, 10, 11, 13, 16
See application file for complete search history.

(56) References Cited

U.S. PATENT DOCUMENTS

| | | | | |
|---|---|---|---|---|
| 4,310,269 | A * | 1/1982 | Neu ........................ | B23B 47/32 |
| | | | | 408/10 |
| 6,665,948 | B1 | 12/2003 | Kozin et al. | |
| 6,925,725 | B2 * | 8/2005 | Herrmann ................ | B21J 15/10 |
| | | | | 33/638 |
| 9,102,026 | B2 * | 8/2015 | Miller ................ | B23Q 17/0966 |
| 9,204,885 | B2 * | 12/2015 | McGinley .............. | A61B 17/16 |
| 9,486,859 | B2 * | 11/2016 | Fujita ...................... | B23B 49/00 |
| 2004/0055173 | A1 | 3/2004 | Herrmann et al. | |
| 2010/0183389 | A1* | 7/2010 | Bisiach ................... | B23B 35/00 |
| | | | | 408/1 R |

(Continued)

FOREIGN PATENT DOCUMENTS

| | | |
|---|---|---|
| DE | 20 2008 003 538 U1 | 7/2008 |
| GB | 2492866 A | 1/2013 |
| WO | 2008080713 A1 | 7/2008 |

*Primary Examiner* — Christopher Fulton
(74) *Attorney, Agent, or Firm* — Hauptman Ham, LLP

(57) ABSTRACT

A method of determining a depth of a hole formed in a work piece is disclosed. The method includes determining the hole depth based upon a load signal indicative of a load on a tool forming the hole during the forming of the hole. The hole depth determined is then adjusted with an offset and component specifications are combined with the hole length to determine a component specification for use in the hole to fix components together. At least a part of the depth determination and component specification can be carried out automatically in a computer, for an array of holes.

15 Claims, 4 Drawing Sheets

(56) References Cited

U.S. PATENT DOCUMENTS

2011/0020084 A1   1/2011  Brett et al.
2013/0017027 A1   1/2013  Miller
2017/0106452 A1*  4/2017  Andersson .............. B23B 49/02

* cited by examiner

METHOD AND APPARATUS FOR DETERMINING A HOLE DEPTH

RELATED APPLICATIONS

The present application claims priority from Great Britain Application No. 1422820.9, filed Dec. 19, 2014, the disclosure of which is hereby incorporated by reference herein in its entirety.

FIELD OF THE INVENTION

The present invention relates to the fabrication of multi-layer structures. In particular, the invention relates to the measurement of hole depths of holes formed in a structure, particularly in multi-layered structures.

BACKGROUND OF THE INVENTION

In the manufacture of many different products, there is a need to attach multiple layers of same or different materials to one another. This can be carried out by forming holes by drilling or machining through multiple layers of material and inserting an elongate fixing means, such as a rivet, a screw or a bolt into the hole.

In certain circumstances, the depth of the remaining holes or the thickness of the materials is either not critical, or the depth or thickness is known to a sufficient degree from the design drawings and known factors from the manufacture of the components being drilled and fixed. In these instances, a bolt or rivet can be chosen based upon design parameters known from the design and component specification process.

However, in other applications, the thickness of the materials being fixed may not be known, this can be due to manufacturing tolerances resulting from the manufacturing process used to make the materials to be fastened together. Further, in certain applications, it is of importance to accurately match the length of the fixing means to the depth of the hole very precisely. This is a particular problem in high precision and safety critical products such as aircraft components and assemblies. The problem can particularly arise where multiple layers of differing materials are used, particularly where composites are used, whose depth can vary depending upon the particular lay-up of the fibres in composite components.

It is therefore necessary in some situations to accurately measure hole depth before choosing an appropriately dimensioned fixing means for fixing the multiple components together.

The present invention therefore seeks to address these issues and to provide an improved manufacturing and assembly process.

SUMMARY OF THE INVENTION

A first aspect of the invention provides a method of determining a length for a component to be located in a machined hole, comprising the steps of:
using a machine to form at least one hole in a work piece, from a first surface of the work piece, through the work piece, to a second surface of the work piece;
monitoring a tool load signal, indicative of a load on a tool of the machine, during the forming of the hole;
determining from the tool load signal a depth of the hole, from the first surface of the work piece to the second surface of the work piece; and
determining, based upon the determined hole depth, a specified length for a component to be located in the hole.

The method of the invention permits automated determination of hole depths for a hole or holes made using a hole forming machine, based upon data gathered at the time of forming the hole, which removes the need for further depth measuring operations.

The method may further comprise forming an array of holes in the work piece. This allows greater arrays of holes to be measured during their formation.

The work piece may be an assembly comprising plural components to be fixed together using fixing means to be located in the holes to be drilled.

The work piece may comprise an assembly, preferably comprising a plurality of layers of sheet material.

The work piece may comprise a wing component of an aircraft.

Determining the hole depth may comprise applying an offset value to a calculated hole depth determined from the tool load signal. This allows for correction of the calculated hole depth based upon known parameters of the hole forming operation, work piece or tool forming the hole.

The offset value may be selected based upon properties of the material or of materials of the work piece.

The offset value may be selected based upon properties of the tool.

The step of determining the hole depth may comprise determining a threshold above which the tool load indicates that the hole is being formed and determining a length over which the load remains above the threshold. This allows simple processing of the load signal to determine a calculated hole depth. The processing of the load signal may happen in real time, or may be carried out on a stored record of the load signal after the hole is formed.

Determining the hole depth may include determining a tool breakthrough threshold value for the tool load signal, substantially at or below which the tool is determined to have penetrated an opposite surface of the work piece. Tool breakthrough signifies that the tip of the tool has fully penetrated the opposite surface of the work piece to form a complete and substantially uniform minimum bore diameter through the entire work piece.

The tool breakthrough threshold value may be determined based upon a value of the tool load signal before breakthrough. This can account for tool load values during the formation of the main bore of the hole The tool breakthrough threshold value may be determined based upon a value of the tool load signal after breakthrough. This allows the load on the tool present even after the tip has exited the work piece to be accounted for in determining tool tip breakthrough.

The tool breakthrough threshold value may be determined based upon a difference between the value of the tool load signal before breakthrough and the value of the tool load signal after breakthrough. This allows both of those values to be accounted for in determining the point of tool breakthrough.

The tool breakthrough threshold value may be determined based upon an average of the load signal before breakthrough.

The tool breakthrough threshold value may be determined based upon an average of the load signal after breakthrough. This averaging allows variations due to vibration and variations in the work piece to be smoothed out from the load signal to avoid significant errors being introduced by rapid fluctuations in the signal.

The invention further provides an electronic device, arranged to determine a depth of a hole drilled in a work piece, from a first surface of the work piece, to a second surface of the work piece, based upon a tool load signal, indicative of a load on a tool of a hole forming machine during the forming of the hole by the machine.

The device may be configured to carry out any of the determining, calculating or specifying steps and may be comprised in a computer separate from the machine forming the hole, or may be comprised in a machine forming the hole. Some of the steps described herein may be performed on the machine forming the hole and later, or other, steps may be carried out on a second, separate, computing device.

BRIEF DESCRIPTION OF THE DRAWINGS

Embodiments of the invention will now be described with reference to the accompanying drawings, in which.

DETAILED DESCRIPTION OF EMBODIMENT(S)

Figure 1:
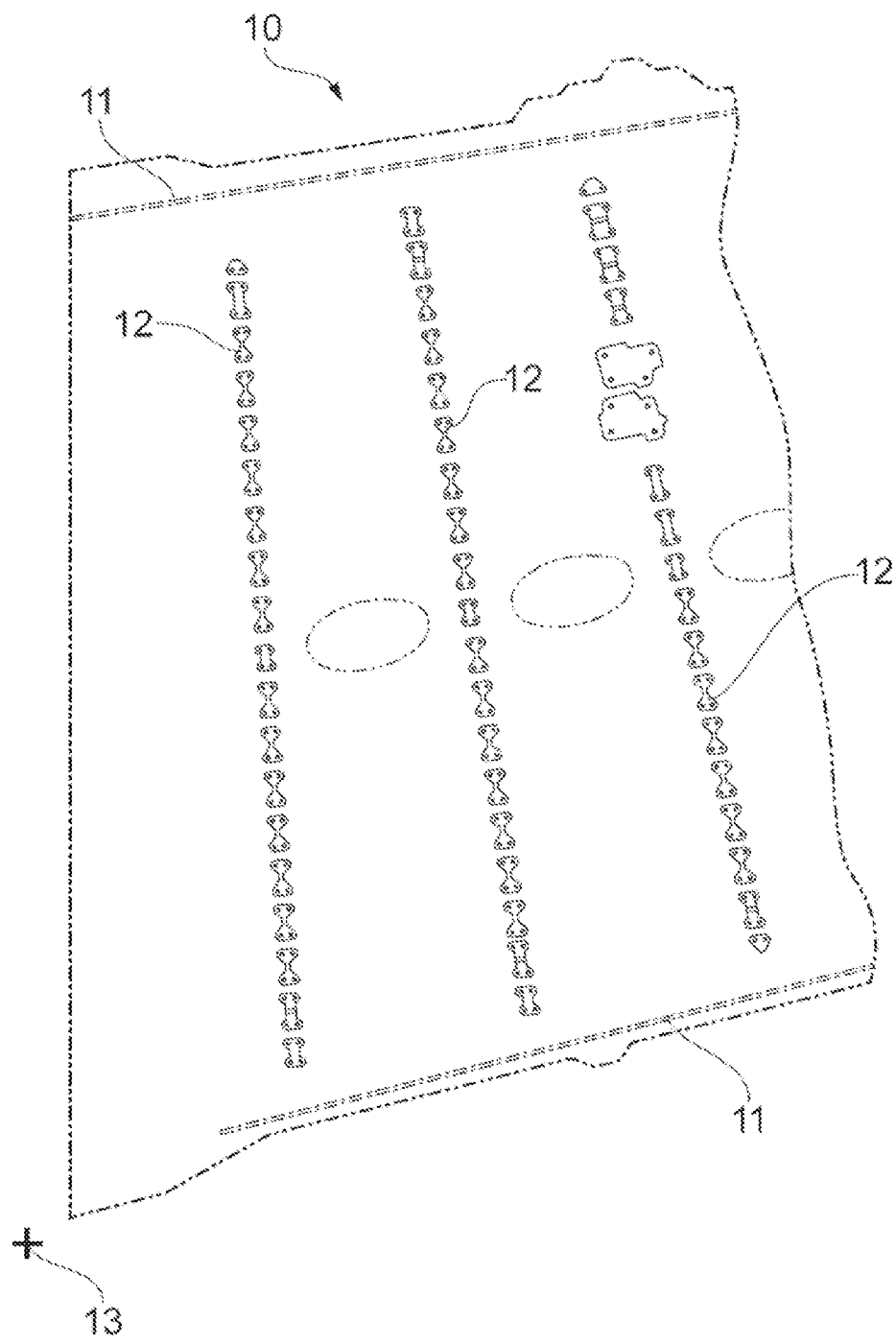
FIG. 1 shows a schematically wing map for an aircraft wing.

FIG. 1 illustrates a wing map 10. The wing map illustrates schematically the outline of a portion of a wing, and the drawing show rows 11, 12, of individual holes through which fixing means such as bolts will be placed to attach an outer wing layer or layers to ribs and/or spars of the wing assembly, which comprises one or more wing covers and one or more wing spars and wing ribs. The rows 11 represent holes which will be drilled to allow fixing means to attach the wing outer cover to the spars. The rows 12 represent holes which will be drilled to allow for fixing means to attach the wing outer covers to wing ribs. The locations of each hole to be drilled in the assembly will be stored as a set of dimensional X, Y and preferably Z co-ordinates relative to a datum point 13. Each hole will also be allocated an individual identifier code, unique to the hole on that component.

In the initial wing map, no depth values are stored for the holes, since the holes must simply penetrate through the assembly. Due to manufacturing tolerances in the materials used in the assembly, the hole depth may not be known to a sufficient degree of precision until the hole has been drilled. This can mean that once all of the holes are drilled, a manual exercise is required, using manually operated tools to measure the precise depth of each of the holes, resulting from variations in tolerances on the thickness of materials used in the assembly. The measurement of the hole depth can be carried out using manually operated tools, which are inserted into a hole after the hole has been drilled, in a separate operation, to measure a distance from a surface on a first side of the hole to the surface on the other side of the hole. This manually measured hole depth can then be used to select an appropriately dimensioned fixing means for the measured hole. The manual measurement process is sufficiently accurate, but can require significant time and labour and so can be lengthy and time consuming.

Figure 2:
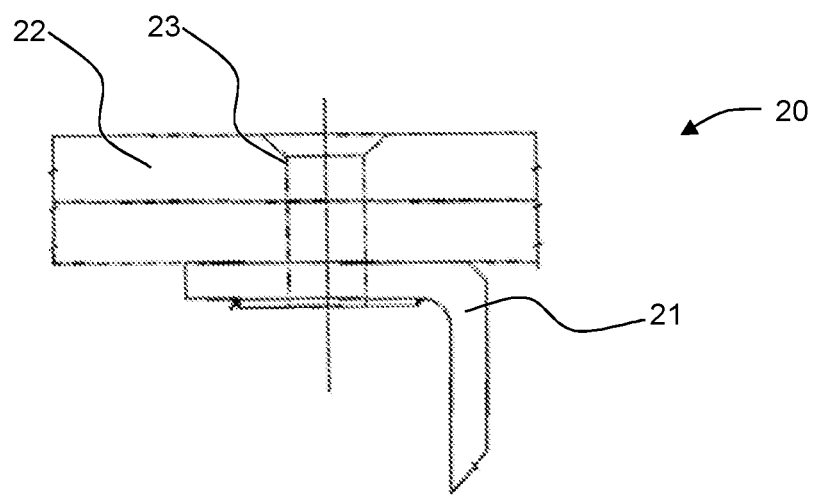
FIG. 2 shows an example of a position on the assembly of FIG. 1 where a hole is to be drilled.

FIG. 2 illustrates a section through a set of components to be drilled at one of the whole positions indicated in the wing map of FIG. 1. A rib foot 21 and at least a wing cover 22 are clamped or otherwise held in position relative to one another in readiness for a hole to be drilled at a location indicated by dashed lines at 23. Other components may be included in the assembly.

Figure 3:
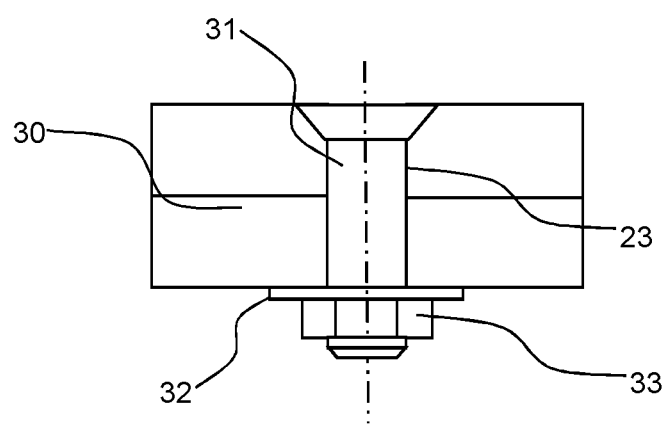
FIG. 3 illustrates a machine which may be used in the carrying out of the invention.

Once the hole 23 has been drilled, the assembly 30, represented schematically in FIG. 3, will be secured by location of a bolt 31 in the drilled hole, while a washer 32 and a nut 33 will be located on the bolt to fix the assembly in place as illustrated in FIG. 3. The assembly 30 may comprise any of the components shown in FIG. 2, or other wing components or components of any assembly.

In certain implementations, and in particular in the manufacture of aircraft components, it can be critical that the bolt 31 is appropriately specified so that its shaft length is sufficient to allow washer 32 and nut 33 to locate correctly and fix securely in place during the assembly process. Bolt 31 may be countersunk to remain flush with the outer surface of the assembly being fixed. Further, in certain implementations, the shaft of the bolt must have no threads within the work piece in the final assembly. Further, it may be necessary to ensure that bolt 31 is also not too long, to prevent excessive protrusion of the bolt 31 from nut 33. Further, in aircraft manufacture, it is important that each component is completely traceable through the process and so a specified bolt or bolt type must be specified and traceably recorded as having been inserted at each location indicated on the wing map of FIG. 1. For this reason, it is necessary to accurately measure the depth of the hole 23 drilled through the assembly, so that an appropriately specified bolt 31 can be selected for each individual hole in the assembly. Otherwise, a 'trial and error' approach to finding the right length bolt would be time consuming.

Sufficiently accurate measurement of the hole depth can be a manual process, as described above, which results in a labour intensive and relatively slow process.

Figure 4:
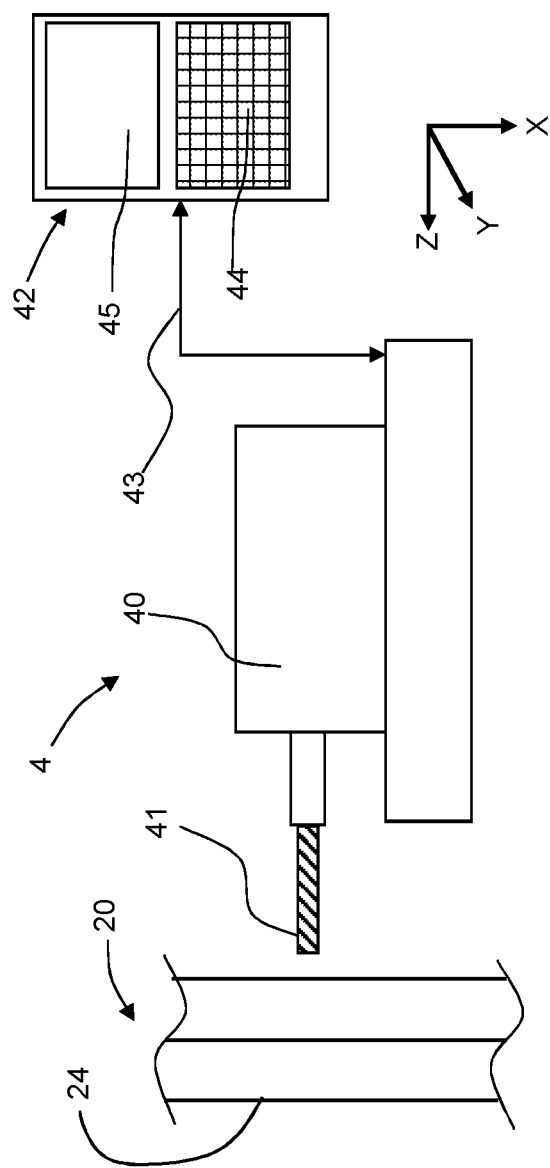
FIG. 4 shows a schematic illustration of a computer controlled drilling machine for use in an embodiment.

FIG. 4 schematically illustrates a computer controlled drilling machine, which can be used to automatically drill all of the holes indicated in the wing map of FIG. 1. Such machines are known for use in the drilling of bolted assemblies and a particular machine used in production by the applicant is known as a Composite Automated Wing Drilling Equipment, or CAWDE, distributed by Electro Impact, Inc. The machine may be monitored and controlled by an electronic controller 42. The controller may comprise a display 45 for output to a user and an input means 44 for receiving user input. A data communications link 43 may be provided, which permits control data to be provided to the drilling mechanism 40 and can allow for output data, such as a signal indicative of a load on the drill bit 41 to be output to the controller 42. Such a load signal may be processed in real time or near-real time by the controller 42, or may be saved for later processing to determine hole depths of holes formed by the drilling machine 4. The data communications link 43 may be wired or wireless, and the controller 42 may be comprised in the drilling machine 4 or may be a separate electronic device. Control and data processing may be split between two devices 42, one integrated into the drilling machine 4 and one being a separate electronic device.

The assembly 20, only a portion of which is illustrated in FIG. 4, is secured in place in, or in relation to, the drilling machine 4, and the drilling mechanism 40 is moveable along axes X and Y, as illustrated in the figure, to move the position of the drill bit 41 to a new hole location as indicated on the wing map of FIG. 1. Next, the drill is advanced along axis Z to drill the necessary hole through the material at a location defined on the wing map.

As the tool 41, which may preferably be a drill bit, is advanced in the Z direction, it experiences varying loads as it initially contacts, penetrates through the full depth of, and then emerges to the opposite side 24 of, the work piece. These varying loads experienced by the tool 41 are transferred through the tool 41 and can be measured on a load measuring device provided optionally in the tool 41 itself or in the drilling mechanism or motor or the machine 40. The load measured may be a rotational torque, or a load in the Z direction as indicated on the figure.

Figure 5:
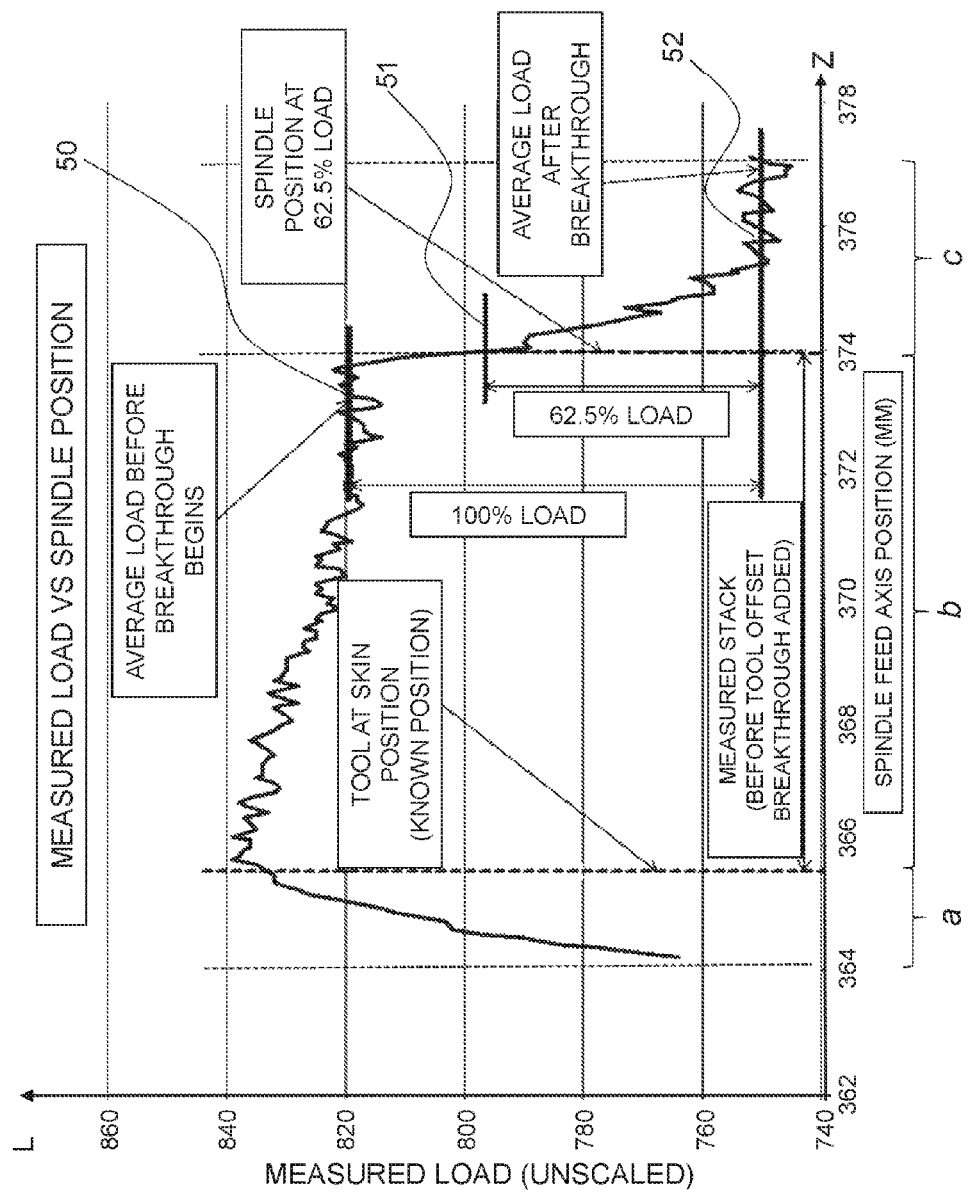
FIG. 5 illustrates a graph of a load on a tool over a distance drilled through a work piece for use in the present invention.

An illustrative load graph is shown in FIG. 5. The load is shown on axis L, while the distance Z is shown on the horizontal axis. The machine used to form the hole, can be equipped with a clamping nose piece, or another means of defining or sensing the start point on the Z axis for the drilling process. This point can be defined as the datum point for calculation of positions on the Z axis and can define the beginning of the data gathering to create the load signal graph of FIG. 5. A load signal can therefore be represented as a real time signal monitored as it is created, or a signal which is recorded for later processing and presentation in a graphical form if necessary.

As can be seen in the graph, during initial contact, in the region marked a on the graph, the load L increases as the drill bit is advanced into the material. Once the drill penetrates the surface of the material being drilled, the load signal reaches a peak and will then show variations about an average value as it penetrates the assembly which makes up the work piece. During part b of the graph, the drill bit is penetrating through the assembly and experiences a relatively high, relatively constant, but also slightly varying load, as it penetrates different layers of the material, as it encounters variations within the materials, such as penetrating alternating fibre and resin components of composite materials, or as it encounters any inconsistency within the materials themselves. Vibration of the machine will also cause some variation in the actual signal.

As the tool penetrates the opposing surface 24 of the work piece, it will experience a reduced load, which is detected and represented in the graph shown in FIG. 5 in part c of the graph.

The load signal can be processed in the following way to determine a measured hole depth determined from the load signal L which is indicative of a load on the tool forming the hole.

A starting position of the tool can be defined. This can be defined either at a measured, known or sensed point, such as when a nosepiece of the machine, or a sensor or other means defines the Z position as the point when the tool contacts the work piece. This can be known as a 'tool at skin' position, and can therefore be defined either from the load sensor signal or from other system inputs or known parameters.

The load signal is monitored during the penetration of the tool into the work piece. An average of the signal may be calculated, which may be a running average calculated over a certain Z distance. This allows the average load to be determined to verify whether the tool is still determined to be in the work piece in spite of small, or rapid, variations in the load signal.

The signal is monitored and/or analysed for a drop in the load which indicates a point of breakthrough, which is the point when the tool fully penetrates the opposing surface 24 of the work piece. The point of breakthrough may be determined by calculating an average value 50 of the load signal prior to breakthrough, an average load value after breakthrough 52, setting a breakthrough threshold value 51, below which it is considered that the tool has broken through the work piece to fully form the hole, and determining the Z axis position of the tool at the point at which the load signal descended below the threshold value. The hole depth can then be calculated as the Z distance from the known 'tool at skin' position, in which position the tool first contacts the skin, to the breakthrough position, where the tool is determined to have fully penetrated the opposing surface 24 of the work piece, by the load signal having descended below the chosen threshold value.

The breakthrough threshold may be calculated as a percentage of the differential load, which can be set as the difference between average tool load before tool breakthrough and average tool load after breakthrough. For example, in FIG. 5, it is determined at 62.5% of the difference between the average tool load before breakthrough and the average tool load after breakthrough, or 62.5% of the differential load. The percentage threshold for determining breakthrough may, however, be set at other advantageous values. Useful values may be between 10% and 90% of the differential load, preferably between 20% and 80%, more preferably 25% and 75%, more preferably between 30% and 70%, yet more preferably between 55% and 65% and further more preferably between 60% and 65% of the differential load.

Different tools can create different gradients of the load signal as it increases or decreases during tool penetration and breakthrough. For example, a drill bit with a narrow-angled tip may have a more gradual load increase as its angled tip portion penetrates into the work piece, whereas a flat ended tool or drill bit would demonstrate a sharper increase and drop-off of the load as it initially penetrates and then breaks through the opposing surface.

Therefore, it is not necessarily the case that the hole depth directly calculated as described in the above from the load signal, is always truly indicative of the real depth of the hole 30 drilled in the assembly 20. Various factors can be adapted to allow for this potential source of error.

The percentage ranges indicated above can be varied to compensate for these variations in tool performance. Alternatively, it is possible to apply an offset value to the initial hole-depth determined over portion b of the graph of FIG. 5, to convert the apparent measured hole depth into an actual hole depth. This offset value may vary depending upon the properties of one of the layers encountered by the tool such as the last layer 24 encountered by the tool, during the breakthrough phase indicated by c in FIG. 5, and/or properties of the tool itself.

The actual value of the offset that is necessary to apply can change from one tool to the next and can be determined empirically once the need for the offset has been identified. The process can be repeated with a range of samples to determine the appropriate off-set and to optimise repeatability. In the method of the present invention, an initial step can include determining a first, measured, length of the hole, based upon a signal L indicative of a load on a tool of the drilling machine during the drilling process. For each hole drilled, a load-based hole depth can be determined from the graph of FIG. 5 and then stored and associated with a hole reference associated with a hole of the wing map shown in FIG. 1.

This calculation can happen in the computer controlling the drilling machine itself, or the load versus time or distance data can be exported and a calculation can be carried out on a separate computer to determine a calculated depth b of each hole on the wing map 10.

An offset value can be applied to the length b of each hole, dependent upon the tool and/or the materials in the first and/or last layers of the assembly, or indeed any of the layers in the assembly which may influence the calculation, and this offset may be determined to be anything from 0 mm to several mm. Tolerances on some components' dimensions can be up to 7% and so where a number of components is included in an assembly, these tolerances can build up over the numerous layers. The offset value applied may be any one of the range of individual integer percentage values, or tenth-of-a-percentage values, up to 7% of the calculated hole depth, or more, in some cases, up to 10% or more.

Once this adjusted hole length has been determined based upon the measured length b, plus any offset to be applied, then a further operation can be carried out to determine whether any additional components are to be retained by the fixing means, i.e., the bolt in question. For example, if a washer is determined from design records to be present, then the length of the shaft of the specified bolt must be sufficient to account for this washer and so a further component depth may be added to the value previously calculated, to determine a shaft length or a "grip length" of the bolt specified for the hole in question. This can define a length of the bolt over which the shank must contain no threads and/or will be contained in the component or assembly in which the hole has been formed.

An overall "buried" length, also known as a "grip length" for a bolt can therefore be determined as the initial calculated length b, plus an offset Δ, plus a further thickness T associated with any additional components to be added to the assembly.

By this process, an array of bolt grip lengths associated with every hole on the wing map of FIG. 1 can be determined, based upon both measured parameters and known component properties. Then, knowing an appropriate nut depth for the bolt in question, the overall threaded length of the bolt can be determined and, based upon either the grip length alone, or the grip length plus the nut depth, an appropriated bolt can be specified for every hole in the wing map of FIG. 1. A nut applied to the bolt may have a counterbore, which allows for the threadless shank to continue beyond the hole, while the nut still engages the threaded, exposed, part of the bolt and tightens against the assembly.

The wing map can then include data of each of an array of drilled holes, and also the specific properties or specifications of each fixing means to be located in each hole. A final wing map can then contain a unique hole identifier for each hole in the map, and one or more of a bolt type, nut type, specification of any need for, and details of, a further component, such as a washer, if required, as well as X and Y coordinates for the hole. This data can then be transmitted to a purchasing department so that stock levels of the necessary components can be properly managed and additional components ordered as and when necessary in line with demand in a fast and efficient manner, helping maintain a lean but sufficient stock supply.

All of those steps can be programmed into an automated process in one or more computers, by use of dedicated software, or appropriately programmed calculations in a database, spreadsheet or bill of materials, management and/or accounting software if necessary.

Further, it is also possible to create a version of the wing map of FIG. 1, on which the detailed specification of each fixing means to be located in each hole at each set of co-ordinates on the wing map is represented. This can be displayed to a technician completing the assembly process, either electronically or on paper as a reference document for the assembly process. Further, a three dimensional array of openings may be created, with the appropriate fixing means, having the appropriate specifications, placed in each opening, each opening corresponding to one of the holes indicated on the wing map of FIG. 1. In this way, a physical representation of the wing map of FIG. 1 can be presented to a technician with the necessary components located on the 2D or 3D representation, at a corresponding location to the locations defined on the wing map, so that there is no ambiguity for the technician as to which component should be located in which hole on the final assembly.

The automated hole depth measurement, offset adjustment, component specification and logging of all of the data on appropriately shared information systems therefore allows more rapid assembly of an overall aircraft wing, since the step of separately measuring the hole depth is done automatically during drilling of the holes. Therefore, this labour intensive step is removed from the process. Further, determining the hole depth automatically in a computer controlled drilling machine during the process also allows a bill of materials to be managed more effectively and efficiently and allows a set of components for each wing assembly, appropriately specified for each hole in the wing assembly, to be collated and prepared for technicians to complete the assembly in a fast and efficient manner.

An electronic device may be configured to carry out any of the determining steps described herein, such a device and may be comprised in a computer separate from the machine forming the hole, or may be comprised in a machine forming the hole. Such a machine may include a hand held machine, but preferably a computer controlled machine arranged to automatically carry out the hole-forming and depth-determining steps automatically for an array of holes. Some of the steps described herein may be performed on the machine forming the hole, and later steps, or other intervening steps may be carried out on a second, separate, computing device. Such a computing device may be a computer, or a handheld electronic device, including a portable laptop or other workshop computing device, or a mobile communications device such as a tablet device or a mobile telephone, the device comprising appropriately configured software. The invention can therefore be embodied in a computer program product containing instructions which, when run by a processor of an electronic device, cause the device to be configured to carry out one or more of the steps of the methods described herein.

Although the invention has been described above with reference to one or more preferred embodiments, it will be appreciated that various changes or modifications may be made without departing from the scope of the invention as defined in the appended claims.

The invention claimed is:

1. A method of determining a length for a component to be located in a machined hole, comprising the steps of:
   using a machine to form at least one hole in a work piece, from a first surface of the work piece, through the work piece, to a second surface of the work piece opposite the first surface;
   monitoring a tool load signal, indicative of a load on a tool of the machine, during the forming of the hole;
   determining from the tool load signal a depth of the hole, from the first surface of the work piece to the second surface of the work piece;

determining, based upon the determined hole depth, a specified length for a component to be located in the hole;

wherein determining the hole depth includes setting a tool breakthrough threshold value for the tool load signal, substantially at or below which the tool is determined to have penetrated the second surface of the work piece; and, wherein the tool breakthrough threshold value is determined based upon an average of the load signal before breakthrough.

2. A method according to claim 1, further comprising forming an array of holes in the work piece.

3. A method according to claim 1, wherein the work piece is an assembly comprising plural components to be fixed together using fixing means to be located in the holes to be drilled.

4. A method according to claim 3, wherein the work piece comprises a plurality of layers of sheet material.

5. A method according to claim 1, wherein the work piece comprises a wing component of an aircraft.

6. A method according to claim 1, wherein the step of determining the hole depth comprises determining a threshold above which the tool load indicates that the hole is being formed and determining a length over which the load remains above the threshold.

7. The method according to claim 1, wherein the tool breakthrough threshold value is determined based upon a value of the tool load signal after breakthrough.

8. The method according to claim 7, wherein the tool breakthrough threshold value is determined based upon a difference between the value of the tool load signal before breakthrough and the value of the tool load signal after breakthrough.

9. A method according to claim 1, further comprising selecting the component from a plurality of components having varying lengths.

10. A method according to claim 1, wherein the steps of determining, calculating, or specifying are carried out automatically on the same machine that forms the hole.

11. A method of determining a length for a component to be located in a machined hole, comprising the steps of:
using a machine to form at least one hole in a work piece, from a first surface of the work piece, through the work piece, to a second surface of the work piece opposite the first surface;
monitoring a tool load signal, indicative of a load on a tool of the machine, during the forming of the hole;
determining from the tool load signal a depth of the hole, from the first surface of the work piece to the second surface of the work piece;
determining, based upon the determined hole depth, a specified length for a component to be located in the hole;
wherein determining the hole depth includes setting a tool breakthrough threshold value for the tool load signal, substantially at or below which the tool is determined to have penetrated the second surface of the work piece;
wherein determining the hole depth comprises applying an offset value to a calculated hole depth determined from the tool load signal; and, wherein the offset value is selected based upon properties of the tool.

12. A method of determining a length for a component to be located in a machined hole, comprising the steps of:
using a machine to form at least one hole in a work piece, from a first surface of the work piece, through the work piece, to a second surface of the work piece opposite the first surface;
monitoring a tool load signal, indicative of a load on a tool of the machine, during the forming of the hole;
determining from the tool load signal a depth of the hole, from the first surface of the work piece to the second surface of the work piece; and determining, based upon the determined hole depth, a specified length for a component to be located in the hole,
wherein determining the hole depth includes setting a tool breakthrough threshold value for the tool load signal, substantially at or below which the tool is determined to have penetrated the second surface of the work piece,
wherein the tool breakthrough threshold value is determined based upon a value of the tool load signal before breakthrough.

13. A method of determining a length for a component to be located in a machined hole, comprising the steps of:
using a machine to form at least one hole in a work piece, from a first surface of the work piece, through the work piece, to a second surface of the work piece opposite the first surface;
monitoring a tool load signal, indicative of a load on a tool of the machine, during the forming of the hole;
determining from the tool load signal a depth of the hole, from the first surface of the work piece to the second surface of the work piece;
determining, based upon the determined hole depth, a specified length for a component to be located in the hole; and, further comprising selecting the component having the specified length, wherein the tool breakthrough threshold value is determined based upon an average of the load signal after breakthrough.

14. An electronic device arranged to determine a depth of a hole drilled in a work piece, from a first surface of the work piece, to a second surface of the work piece opposite the first surface, based upon a tool load signal, indicative of a load on a tool of a hole forming machine during the forming of the hole by the machine, wherein determining the hole depth includes setting a tool breakthrough threshold value for the tool load signal, substantially at or below which the tool is determined to have penetrated the second surface of the work piece and wherein the device is further configured to determine, based upon the determined hole depth, a specified length for a component to be located in the hole,
wherein determining the hole depth comprises applying an offset value to a hole depth calculated from the tool load signal, and wherein the offset value is selected based upon properties of the material or materials of the work piece.

15. An electronic device arranged to determine a depth of a hole drilled in a work piece, from a first surface of the work piece, to a second surface of the work piece opposite the first surface, based upon a tool load signal, indicative of a load on a tool of a hole forming machine during the forming of the hole by the machine, wherein determining the hole depth includes setting a tool breakthrough threshold value for the tool load signal, substantially at or below which the tool is determined to have penetrated the second surface of the work piece and wherein the device is further configured to determine, based upon the determined hole depth, a specified length for a component to be located in the hole,
wherein determining the hole depth comprises applying an offset value to a hole depth calculated from the tool load signal, and, wherein the offset value is selected according to properties of the tool.

* * * * *